Aug. 22, 1967     J. C. RENFRO     3,336,755
ARABLE LAND DRAINAGE SYSTEM WITH STORAGE
Filed Feb. 3, 1964     2 Sheets-Sheet 1
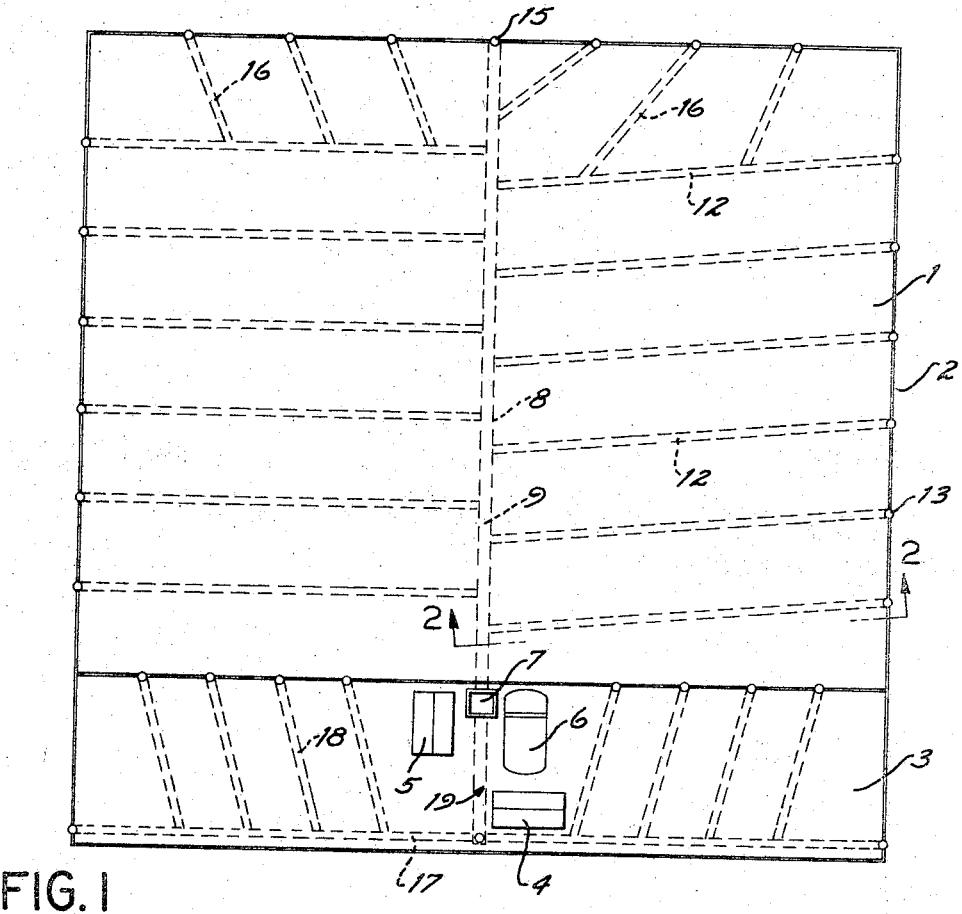
FIG. I
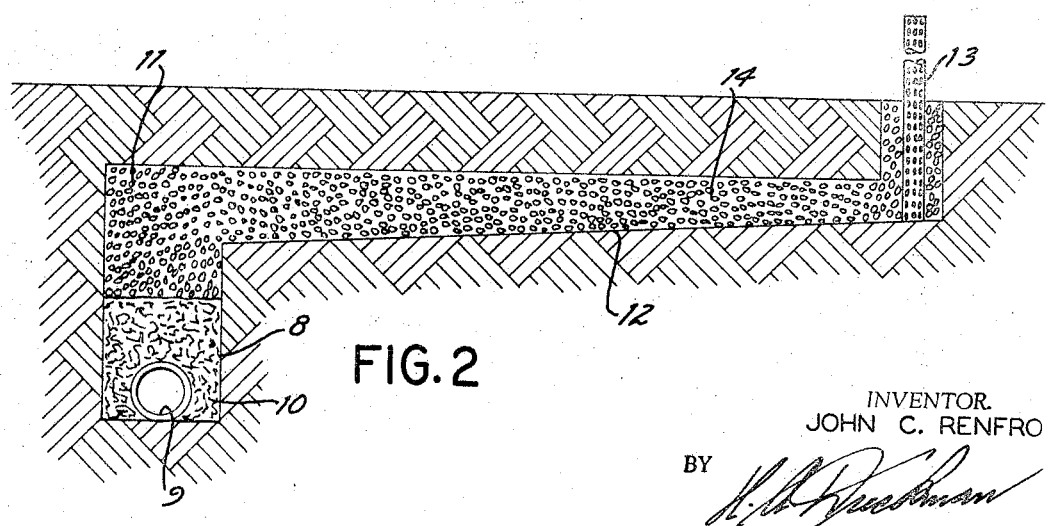
FIG. 2
INVENTOR.
JOHN C. RENFRO
BY
ATTORNEY

United States Patent Office 3,336,755
Patented Aug. 22, 1967

3,336,755
ARABLE LAND DRAINAGE SYSTEM WITH STORAGE
John C. Renfro, Huntington Beach, Calif. (48 Doheny Park Village, 34202 Del Obispo, Dana Point, Calif. 92629)
Filed Feb. 3, 1964, Ser. No. 342,186
4 Claims. (Cl. 61—11)

This invention relates to a method and means of irrigating and fertilizing arable land, and especially to a means of conserving the water which is used in irrigating the land.

An object of my invention is to provide a method of irrigating and fertilizing arable land in which the excess water used in irrigation is returned to a central collection area for redistribution onto the land.

Another object of my invention is to provide a method and means of irrigating and fertilizing arable land in which the excess water which is returned to a central collection point is fertilized and aerated before the water is redistributed onto the land.

Another object of my invention is to provide a method of irrigating and fertilizing arable land in which a relatively small plot of land can be worked by one or two adults, and this small plot of land will adequately economically sustain approximately ten adult people.

Still another object of my invention is to provide a novel method of the character stated in which the irrigating water is distributed onto the land, and the excess is collected from the land with a minimum effort on the part of the adults working that land.

Other objects, advantages and features of invention may appear from the accompanying drawings, the subjoined detailed description and the appended claims.

In the drawing:

FIGURE 1 is a top plan view of a plot of land constructed and arranged in accordance with my method of irrigating and fertilizing that land.

FIGURE 2 is a fragmentary sectional view taken on line 2—2 of FIGURE 1.

Figure 3:
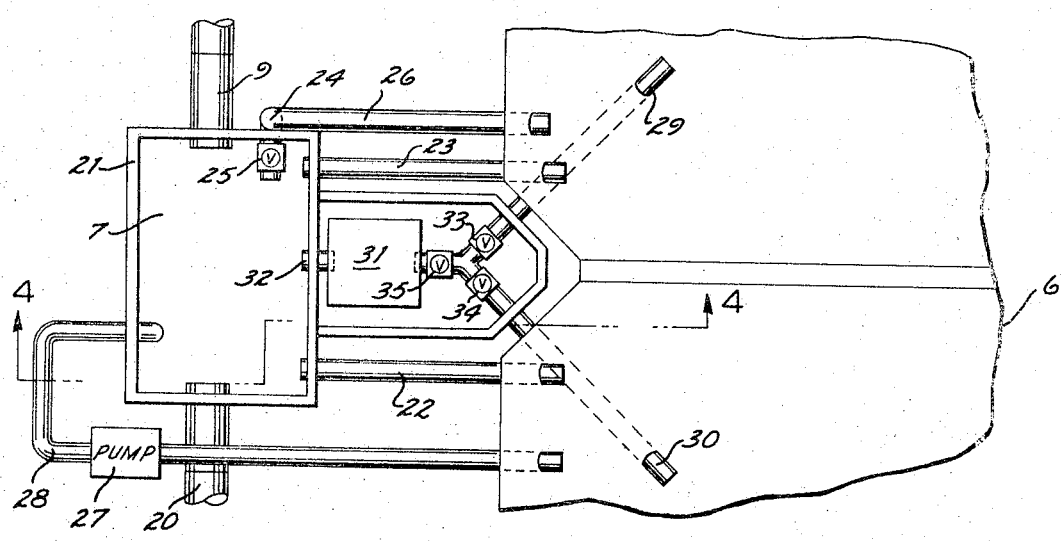
FIGURE 3 is a top plan view of the collection pit and a fragment of the water pond illustrating the means to collect and distribute water on the land.
Figure 4:
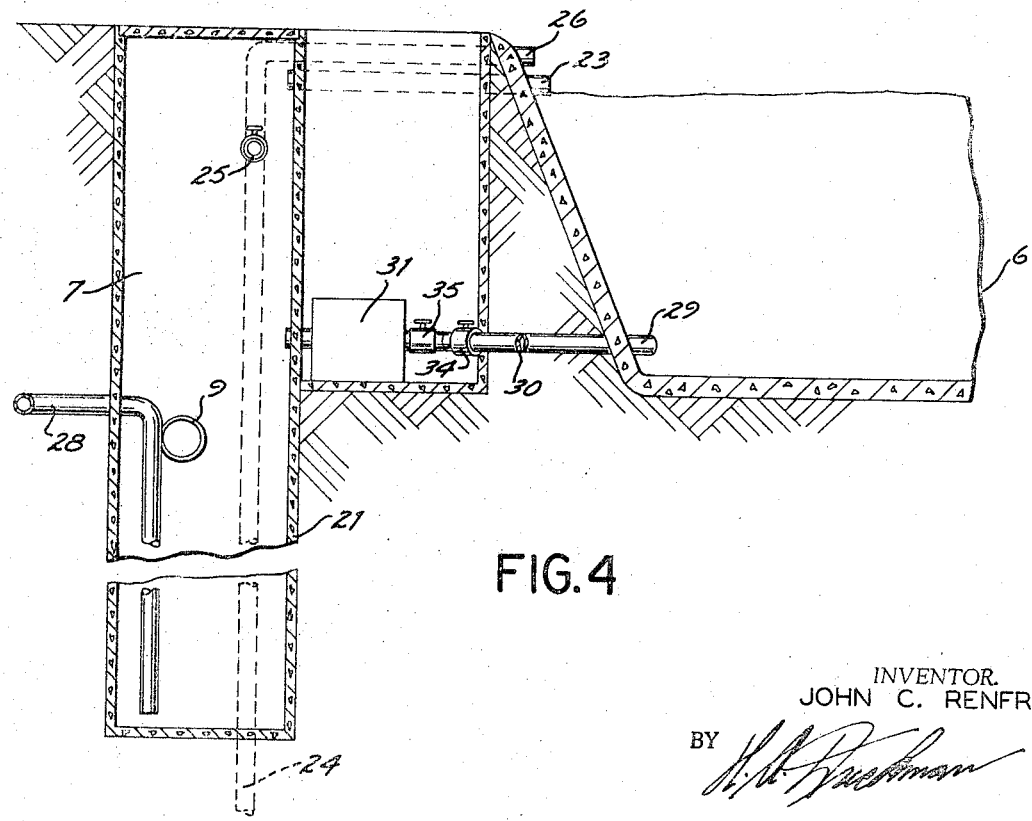
FIGURE 4 is a fragmentary vertical sectional view taken on line 4—4 of FIGURE 3.

Referring more particularly to the drawing, the numeral 1 indicates a rectangular piece of arable land approximately 2½ acres in area, more or less, as might be desired. The outer boundaries of the area 1 is indicated at 2, and this boundary might be defined by a fence, a ledge, or the like. An area 3 is set apart as a garden area for the owner, and may include truck garden, fruit trees, and the like. A house 4 and a barn 5 are placed in the garden area 3. Adjacent to these structures there is provided a water pond 6 and a collection pit 7. The pit 7 is a relatively deep hole which extends vertically into the ground and is used to collect excess water which is flowed onto the land area 1 as a result of irrigation, or also as a result of rainfall, if this should occur.

A ditch 8 is dug in the ground to a depth of about four feet, more or less, and this ditch runs the entire length of the land area 1 from the pit 7 to one outer boundary 2 of the land. The ditch has a slope of about one foot in each 200 feet, so that there will be a drain from the outer boundary of the ditch 8 to the pit 7. A tile 9 is laid in the bottom of the ditch 8 and extends from the outer boundary of the land area 1 to the pit 7, and opens into that pit at one end thereof. This tile is pervious or porous so that water will readily pass into the tile pipe and will flow by gravity into the pit 7. A perforated stand pipe is provided at the outer end of the pipe 9 at the boundary of the land area 1, and the type of stand pipe employed will be subsequently described. The ditch 8 is filled to a part of its depth by a mass of humus 10 so that the humus bed entirely surrounds the tile pipe 9. An area 11 in the ditch 8 above the humus 10 is filled with rock or gravel, the rock or gravel being loosely placed so that water will readily percolate through it. Soil to a depth of about twenty inches, more or less, is back filled over the gravel bed 11, so that the area over the ditch 8 may be planted.

A plurality of lateral ditches 12 extend from one boundary land plot 1 and thence into the ditch 8. The lateral ditches 12 are spaced horizontally and these ditches are also sloped or inclined towards the ditch 8 so that water will flow by gravity in these ditches and thence into the ditch 8, and finally into the tile 9. At the outer ends of each of the ditches 12 I provide a vertical pipe 13 which is perforated and which extends well above ground level. The purpose of this pipe is to admit air into the ditches 12 so that the water traversing this ditch will be aerated. The entire ditch 12 is filled with loose gravel, as shown at 14, thus providing a passage which is always open and through which water can quickly and easily percolate. An aerating pipe, similar to the pipe 13, is also provided at the outer end of the ditch 8, as shown at 15, so that water in the tile 9 may also be additionally aerated. A plurality of additional lateral ditches 16 may be variously spaced around the land area 1 so that all sections of the land may have drainage ditches therein which extend either into the laterals 12 or into the main central ditch 8 as may be required, to the end that the entire land area can be effectively drained at a point well below the surface of the ground, so that water after it has passed the roots of various plants on the land area 1 will then be collected and returned to a central pit 7. The garden area 3 may also be provided with a transverse collecting ditch 17 and lateral ditches 18, which have the same purpose of collecting water which has been placed on the land for irrigation purposes, and these ditches and laterals have the same general construction as the ditches 8, 12 and 16. The water from the ditches 17–18 is collected into the ditch 19 and the tile 20 therein, and the tile 20 extends into the pit 7 for the purpose of collecting excess water therein.

The pit 7 consists of a vertically extending inclosure 21 formed of metal, concrete, wood or the like, and has sufficient capacity so that a substantial amount of water can be accumulated therein from the drain tiles 9 and 20. When the pit 7 is filled almost to the top, it overflows through the pipes 22–23 into the pond 6, where the water may be stored. The pond 6 may be so elevated, if desired, that water will flow from this pond onto the land, either by flooding or in ditches, or through a sprinkler system. A type of irrigating pump (not shown) may be used to force water from the pond 6 onto the land, and these pumps are usual and well known in the art and the detailed construction of such a pump is not a part of this invention. The pond 6 may have water impervious walls made of concrete, clay, or the like, as might be most advantageous.

A well casing 24 extends downwardly to the water bearing sand, and a usual well pump (not shown) is used to raise water from the water sands and thence into the pit 7 through a valve 25. By closing the valve 25 water can also be directed through the pipe 26 into the pond 6.

A pump 27 is placed in a pipe 28 which extends from the pit 7 into the pond 6. This pipe and pump are used to pump water from the pit 7 into the pond 6 as might be required, and for the purpose of storing the water which accumulates in the pit. To drain water from the pond 6 back into the pit 7 I provide Y-shaped pipes 29–30 which extend into a humus containing box 31. The box 31, in turn, is drained into the pit 7 through the pipe 32. Valves 33, 34 and 35 control the flow of water into the humus box 31 and thence into the pit 7. This will be evident from FIGURE 3.

*In operation*

Irrigation water is flowed onto the land by means of flooding, or through ditches or through a sprinkler system, to provide sufficient water for the crop. This irrigation water percolates downwardly past the roots of the crop plants, and after the water has passed these roots it will percolate horizontally and find its way into the gravel 14 of the ditches 12. Due to the inclined shape of the ditches 12 the water will flow by gravity into the main ditch 8, thence through the humus pack 10, and eventually into the tile 9. Air is admitted to the lateral ditches 12 and the main ditch 8 through perforated stand pipes 13, which will admit air consistently to these ditches. The accumulated water now flows back into a pit 7 through the tile 9 and 20, and the water accumulates in the pit 7 until it is either permitted to flow into the pond 6 through the overflow pipes 22–23, or the water may be pumped out of the pit by means of the pump 27 and the pipe line 28. The accumulated water in the pond 6 may also be flowed back into the pit 7 by gravity through the pipes 29–30 and fertilized with humus which is placed in the box 31. The water, which is returning from the land area 1 to the pit 7, also flows through a humus pack 10, which again fertilizes the water before it returns to the pit. In this manner the water is not only accumulated, but is also fertilized, and the amount of fertilization can be increased by circulating the irrigation water in the pond 6 through the humus box 31. When the valve 25 is opened, and without using the water pump, water may also be drained back into the underground water strata, thus partly draining the pit 7 if it is found that there is excess water available.

Having described my invention, I claim:

1. A means of irrigating and fertilizing arable land by redistributing water drained from the land consisting of;
   a horizontal main ditch extending the length of a land area and lateral ditches extending from the main ditch,
   a drain tile positioned in the bottom of the main ditch,
   a layer of humus in the main ditch covering said tile,
   a layer of gravel partly filling the main ditch and the humus and the lateral ditches, a layer of arable soil covering said gravel,
   a pit into which said drain tile extends to drain water into the pit by gravity, said drain tile being vertically inclined,
   and a storage pond adjacent said pit to store water from the pit,
   and a drain pipe extending from the pit into the pond.

2. A means of irrigating and fertilizing arable land by redistributing water drained from the land consisting of;
   a horizontal main ditch extending the length of a land area and lateral ditches extending from the main ditch ditch,
   a drain tile positioned in the bottom of the main ditch,
   a layer of humus in the main ditch covering said tile,
   a layer of gravel partly filling the main ditch and the humus and the lateral ditches, a layer of arable soil covering said gravel,
   a pit into which said drain tile extends to drain water into the pit by gravity, said drain tile being vertically inclined,
   and a storage pond adjacent said pit to store water from the pit,
   a drain pipe extending from the pit into the pond,
   and aerating pipes extending vertically into the main ditch and the lateral ditches, said aerating pipes extending from above the surface and thence into said ditches.

3. A means of irrigating and fertilizing arable land by redistributing water drained from the land consisting of;
   a horizontal main ditch extending the length of a land area and lateral ditches extending from the main ditch,
   a drain tile positioned in the bottom of the main ditch,
   a layer of humus in the main ditch covering said tile,
   a layer of gravel partly filling the main ditch and the humus and the lateral ditches, a layer of arable soil covering said gravel,
   a pit into which said drain tile extends to drain water into the pit by gravity, said drain tile being vertically inclined,
   and a storage pond adjacent said pit to store water from the pit,
   a drain pipe extending from the pit into the pond,
   and a feed-back pipe extending from the pond into the pit, said pipe extending into a humus filled box to add humus fertilizer to the water returning to the pit.

4. A means of irrigating and fertilizing arable land by redistributing water drained from the land consisting of;
   a horizontal main ditch extending the length of a land area and lateral ditches extending from the main ditch,
   a drain tile positioned in the bottom of the main ditch,
   a layer of humus in the main ditch covering said tile,
   a layer of gravel partly filling the main ditch and the humus and the lateral ditches, a layer of arable soil covering said gravel,
   a pit into which said drain tile extends to drain water into the pit by gravity, said drain tile being vertically inclined,
   and a storage pond adjacent said pit to store water from the pit,
   a drain pipe extending from the pit into the pond,
   a feed-back pipe extending from the pond into the pit, said pipe extending into a humus filled box to add humus fertilizer to the water returning to the pit,
   and an aerating pipe extending vertically into the main ditch and the lateral ditches, said aerating pipe extending from above the surface and thence into said ditches.

References Cited

UNITED STATES PATENTS

| | | |
|---|---|---|
| 1,171,558 | 2/1916 | Taylor. |
| 1,408,548 | 3/1922 | Trowbridge _ _ _ _ _ _ _ _ _ _ _ 61—11 |
| 2,622,683 | 12/1952 | Silitch. |
| 2,909,002 | 10/1959 | Hendry _ _ _ _ _ _ _ _ _ _ _ _ 61—13 X |

EARL J. WITMER, *Primary Examiner.*